United States Patent
Feiler (10) Patent No.: US 11,519,411 B2
(45) Date of Patent: Dec. 6, 2022

(54) VIRTUAL SENSOR FOR WATER CONTENT IN OIL CIRCUIT

(71) Applicant: Wolfgang Feiler, Constance (DE)

(72) Inventor: Wolfgang Feiler, Constance (DE)

( * ) Notice: Subject to any disclaimer, the term of this patent is extended or adjusted under 35 U.S.C. 154(b) by 254 days.

(21) Appl. No.: 16/686,476

(22) Filed: Nov. 18, 2019

(65) Prior Publication Data

US 2020/0158112 A1     May 21, 2020

(30) Foreign Application Priority Data

Nov. 19, 2018    (EP) ..................................... 18207118

(51) Int. Cl.
     *F04C 28/28*      (2006.01)
     *G01N 11/04*      (2006.01)
     *F04C 29/02*      (2006.01)

(52) U.S. Cl.
     CPC ............ *F04C 28/28* (2013.01); *F04C 29/025* (2013.01); *F04C 29/028* (2013.01); *G01N 11/04* (2013.01); *F04C 2240/81* (2013.01); *F04C 2270/78* (2013.01)

(58) Field of Classification Search
     CPC ...... F04C 28/28; F04C 29/025; F04C 29/028; F04C 2240/81; F04C 2270/78; F04C 2/14; F04C 18/16; G01N 11/04
     See application file for complete search history.

(56) References Cited

U.S. PATENT DOCUMENTS

| 7,722,333 B2 * | 5/2010 | DeRosa | F04C 23/00 |
| | | | 417/234 |
| 2016/0245273 A1 * | 8/2016 | Wagner | F04B 49/007 |

FOREIGN PATENT DOCUMENTS

| DE | 43 13 573 A1 | 10/1994 | |
| EP | 1 475 586 A2 | 11/2004 | |
| GB | 2 277 462 A | 11/1994 | |
| WO | 02/46617 A1 | 6/2002 | |
| WO | WO-0246617 A1 * | 6/2002 | ............ F04C 29/021 |
| WO | 2015/103678 A1 | 7/2015 | |

OTHER PUBLICATIONS

European Search Report dated Jan. 28, 2019 in European Application No. 18207118.3 with English translation of the relevant parts.

* cited by examiner

*Primary Examiner* — Connor J Tremarche
(74) *Attorney, Agent, or Firm* — Collard & Roe, P.C.

(57) ABSTRACT

A method for monitoring an oil-injected screw compressor configured to compress aspirated air by returning oil from an oil separator vessel (11) to a compression chamber (12) of a compressor block (30), for condensate formation in the oil circuit due to a too low compression discharge temperature (VET), determines a water inlet mass flow $\dot{m}_{ein}(t)$ and a water outlet mass flow $\dot{m}_{aus}(t)$ for a point in time t and determines generated condensate flow $\Delta\dot{m}_w(t)=\dot{m}_{ein}(t)-\dot{m}_{aus}(t)$ on the basis of difference formation.

14 Claims, 3 Drawing Sheets

VIRTUAL SENSOR FOR WATER CONTENT IN OIL CIRCUIT

CROSS REFERENCE TO RELATED APPLICATIONS

Applicant claims priority under 35 U.S.C. § 119 of European Application No. 18207118.3 filed Nov. 19, 2018, the disclosure of which is incorporated by reference.

BACKGROUND OF THE INVENTION

1. Field of the Invention

The invention relates to a method for monitoring an oil-injected screw compressor, in which oil from an oil separator tank is returned to a compression chamber of a compressor block, following an unintentional cold run in which condensation occurs due to a too low compression discharge temperature.

2. Description of the Related Art

With oil-injected screw compressors, ambient air is compressed to a higher pressure. The compression process takes place inside the screw compressor block. This generates compression heat. Oil is injected into the screw compressor block to prevent the temperature of the compressed air from rising too high. The oil absorbs part of the compression heat and heats up in the process. The temperature at the end of the compression process can therefore be regulated by changing the temperature and/or quantity of the oil. This temperature is called the compression discharge temperature.

Figure 1:
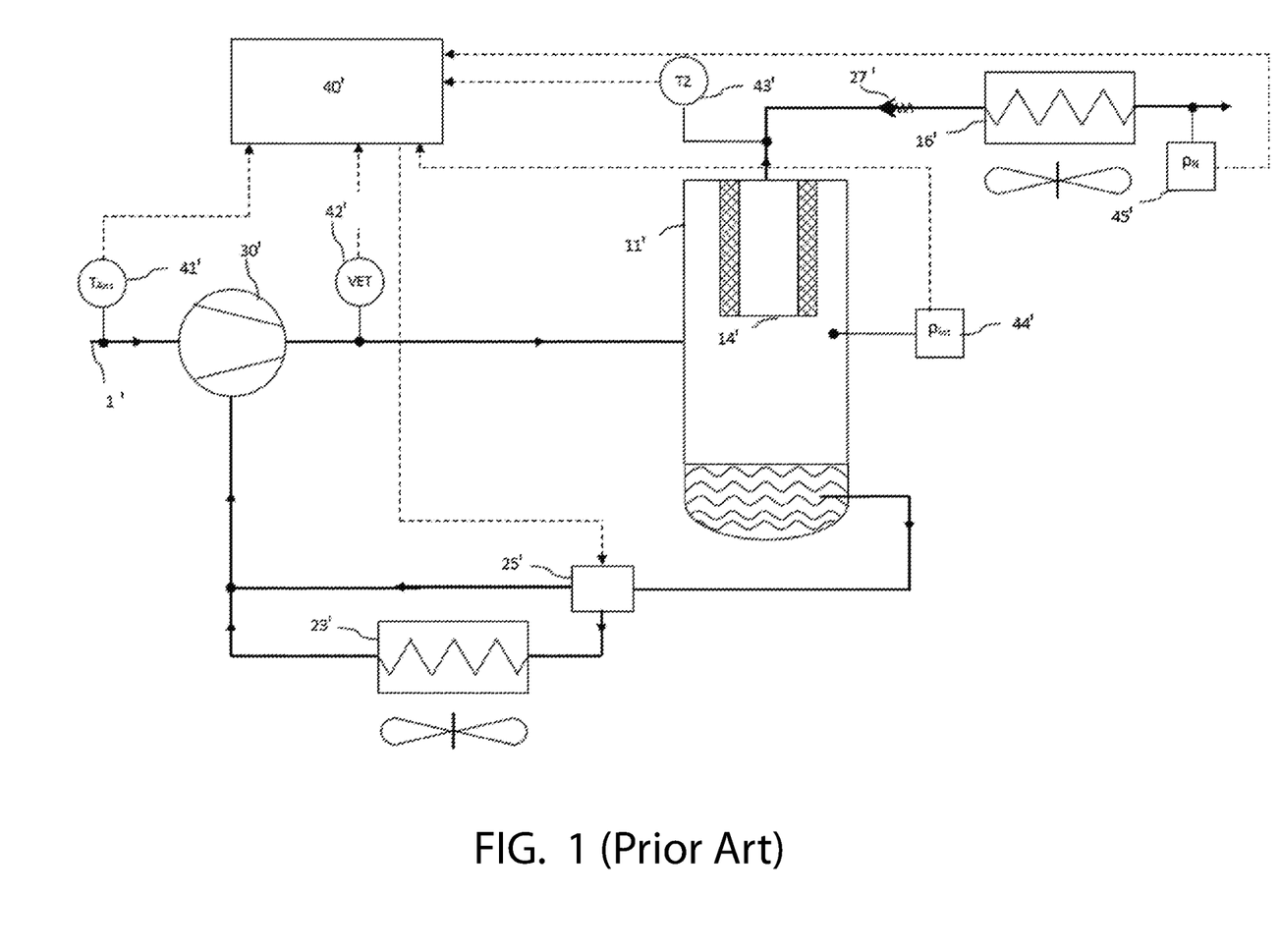
FIG. 1 shows a block diagram of an oil-injected screw compressor with oil separator tank according to the prior art.

FIG. 1 shows a simplified block diagram of an oil-injected screw compressor. At the suction point 1' the ambient air is sucked into the compressor block 30'. The temperature sensor 41' is used to measure the intake temperature $T_{Ans}$. In the compressor block 30' the air is compressed. In this context, oil is injected. The oil-air mixture flows to the oil separator tank. This is where the oil is separated. The separated oil is fed back to the compressor block 30' via a regulating valve 25' either directly or via an oil cooler 23' and injected there again. The temperature of the injected oil can be influenced via the regulating valve 25' and thus the compression discharge temperature measured with the sensor 42' can be regulated.

The compressed air flows over the oil separator tank 11' and is fed to an application via aftercooler 16'. The temperature of the outflowing air is measured with the sensor 43'.

The aspirated atmospheric air contains water vapor. The change in pressure and temperature of the air changes the mass of water, which at most can be present as vaporous. If there is more water in the air in the block and oil separator tank than there can be water vapor, condensation occurs. This can lead to damage.

The compression discharge temperature is normally regulated to a value which is usually in a range between 60° C. and 100° C. To set the compression discharge temperature, the oil circuit includes an oil cooler, the cooling capacity of which can often be influenced by a fan, the speed of which can also optionally be adjusted. If less cooling capacity is required, a partial flow of the hot oil is guided past the oil cooler via a bypass, so that the oil is finally injected into the screw compressor at a predetermined desired temperature and the actual compression discharge temperature is approximated to a target compression discharge temperature. In normal operation, the compression discharge temperature is set to a lower temperature to avoid excessive damage to the oil. On the other hand, the compression discharge temperature must not be so low that condensate forms and water accumulates in the oil circuit. In this respect, the compression discharge temperature is usually set to a value at which condensate formation is definitely avoided. If there is more water in the air in the screw compressor and in the oil separator tank than there can be water vapor, condensation or condensate formation occurs. This can lead to damage. For example, corrosion can occur in the screw compressor.

SUMMARY OF THE INVENTION

In contrast to this, it is the object of the present invention to propose a method to monitor an oil-injected screw compressor, in which oil from an oil separator tank is returned to a compression chamber, for condensate formation in the oil circuit.

This object is solved by a method for monitoring an oil-injected screw compressor according to the features of the invention. Advantageous further developments are indicated below.

A core idea of the present invention is that for a point in time t a water inlet mass flow $\dot{m}_{ein}(t)$ and a water outlet mass flow $\dot{m}_{aus}(t)$ are calculated or determined and from the formation of a difference a generated condensate flow $\Delta\dot{m}_w(t)=\dot{m}_{ein}(t)-\dot{m}_{aus}(t)$ is calculated or determined.

The water inlet mass flow $\dot{m}_{ein}$ concerns the mass flow of vapor contained in the aspirated air.

The water outlet mass flow $\dot{m}_{aus}$ concerns the mass flow of vapor contained in the air leaving the oil separator tank.

The generated condensate flow $\Delta\dot{m}_w$ concerns the change in the condensate mass contained in the oil circuit per time for a time period t.

Although it is theoretically conceivable to determine the water inlet mass flow that was actually aspirated with knowledge of the absolute or relative humidity; in the present case, however, it is regarded as a particularly favorable procedure to assume a worst-case scenario, under the assumption of certain values for the relative humidity, in particular a relative humidity of 100%, and therefore to assume a water inlet mass flow $\dot{m}_{ein}$ based on this scenario. By differential formation with the water outlet mass flow a generated condensate flow $\Delta\dot{m}_w$ is calculated and thus a kind of virtual sensor for the condensate flow $\Delta\dot{m}_w$ is defined.

Although there are approaches in the prior art to consider limit temperatures or dew point temperatures, the fact that a limit temperature or a dew point temperature is undershot alone does not provide any indication of the maximum condensate mass that could actually have occurred. Rather, the respective water inlet mass flow must be included in the consideration, in terms of the variables such as the delivery capacity of the screw compressor and the respective intake temperature $T_{Ans}$. Air at 30° C. has a much higher absolute humidity at 100% humidity than air at 12° C. and 100% relative humidity. In this respect, a mere comparison of temperatures with a dew point temperature is not sufficient.

In general, for humid air, the maximum water mass $m_w$, which can be present as water vapor per air mass $m_a$, results from the vapor pressure of the water at the current temperature $p_{sat,w}(T)$ and the pressure p.

$$\frac{m_w}{m_a} = \frac{p_{sat,w}(T)}{p-p_{sat,w}(T)} \frac{R_w}{R_a},$$

with $R_w$, $R_a$: gas constants of water or air

An increase in pressure therefore causes a reduction in the maximum water mass per air mass. An increase in temperature and thus in vapor pressure leads to an increase in this water mass.

If the aspirated mass of water per air mass is greater than the maximum mass that can be present as vapor in the compressed air after oil separation, liquid water (condensate) forms in the oil circuit (compressor block, oil separator tank and connections with interconnected components).

The minimum temperature at which no condensate can precipitate can be calculated on the basis of the properties of the ambient air (pressure, temperature, humidity) and the operating pressure. The target value for the compression discharge temperature should therefore be determined on the basis of this minimum temperature. This is described in the specification WO 200246617. This specification describes a regulation of the cooling via the speed of a valve fan. Another actuating variable could be a regulating valve that allows some of the oil flow past the oil cooler to the compressor block.

In practice, however, the target value for the compression discharge temperature is not always reached. For example, when starting a screw compressor which has cooled down in a standstill phase, a certain operating time is required until the screw compressor has been sufficiently heated and a sufficiently high outlet temperature can be achieved.

During operating times when the outlet temperature is too low, condensate accumulates in the oil separator tank. In unfavorable cases, too much condensate may accumulate in the oil despite a correct default target value for the temperature regulation, resulting in damage. Such unfavorable cases could be too short load running times, which are always terminated when the target value for the compression discharge temperature has not yet been reached or very low ambient conditions, possibly also a defect in regulating components.

From pressure, temperature and relative humidity of the aspirated air, as well as the conveyed air mass flow, the mass flow of the aspirated water vapor $\dot{m}_{W,ein}$ can be calculated.

The maximum possible mass flow of water vapor $\dot{m}_{W,aus,max}$ can be calculated from the pressure and temperature in the oil separator tank as well as the air mass flow conveyed, assuming a relative humidity of 100%. If condensate is present, i.e. if the mass of the condensate $m_K$ is greater than zero or if more water vapor enters the screw compressor than can escape at most, the escaping water vapor flow it $\dot{m}_{W,aus}$ is given by the maximum possible flow $\dot{m}_{W,aus,max}$. If no condensate is present and less water vapor enters the compressor than can escape at most, the escaping water vapor flow is equal to the flow entering the compressor:

$$\dot{m}_{w,aus} = \begin{cases} \dot{m}_{w,aus,max}, & \text{for } m_K > 0 \text{ or } \dot{m}_{w,ein} > \dot{m}_{w,aus,max} \\ \dot{m}_{w,ein}, & \text{otherwise} \end{cases}$$

If the difference between the two mass flows $$\Delta\dot{m}_w = \dot{m}_{w,ein} - \dot{m}_{w,aus}$$

is positive, more water is introduced into the screw compressor than is discharged. If $\Delta\dot{m}_w$ is negative, more water can be discharged from the screw compressor than can be introduced. In the latter case, water that has already condensed would evaporate again.

In this respect, a further development of the present invention calculates a total generated condensate mass $m_K$ from a summation of the condensate flows generated over a given period of time.

Although different methods are conceivable for summing up the condensate flows occurring over a given period of time, different methods, especially numerical methods, can be used which are easy to handle in terms of calculation technology. Preferably, a numerical integration of the condensate mass change rate $\Delta\dot{m}_w(t)$ or an analog quantity over time is performed.

For example, a calculation is performed as follows: $m_K(t) = m_K(t-dt) + \Delta\dot{m}_w \cdot dt$ with dt=1 s. The respective condensate mass is therefore balanced at each point in time of a scanning structured by given time intervals, wherein the incremental increase or decrease results from a difference between the water inlet mass flow $\dot{m}_{ein}$ and the water outlet mass flow $\dot{m}_{aus}$. Based on the calculated condensate mass, it can be assessed whether there is a risk of condensate damage during current operation.

Preferably, the total generated condensate mass $m_K(t)$ is calculated from a known initial value of the condensate mass $m_K(t_0)$ by numerical integration of the condensate flow $\Delta\dot{m}_w$ over time.

In concrete terms, starting from a known initial value for the condensate mass $m_K(t_0)$, e.g. 0 g during start-up or oil change, condensate mass can be calculated by integration of the mass flow difference $\Delta\dot{m}_w$ over the time t:

$$m_K(t) = m_K(t_0) + \int_{t_0}^{t} \Delta\dot{m}_w(\tau) d\tau$$

This integration can be performed numerically by the control unit during compressor operation. For example, the value for $\Delta\dot{m}_w$ can be calculated in regular time intervals $\Delta t$ and the new value for the condensate mass $m_K(t)$ can be calculated in each case from the value of the condensate mass of the previous point in time $m_K(t-\Delta t)$:

$$m_K(t) = m_K(t-\Delta t) + \Delta\dot{m}_w(t)\Delta t$$

It is understood that other numerical integration methods could also be applied, e.g. using a variable step size and/or using the mass flow difference of more than one point in time in a time step.

The method according to the invention may thus provide in a preferred embodiment that a condensate mass $m_K$ is calculated from a summation of condensate mass changes that have occurred between two points in time, wherein the condensate mass change is calculated from the condensate flows at one or more points in time. In an alternative, preferred embodiment of the method, a change in a generated condensate mass $m_K$ for a specified time interval is calculated by numerical integration of the condensate flow $\Delta\dot{m}_w(t)$ over time.

In a specifically possible embodiment of the invention, the total condensate mass $m_K(t)$ generated at a point in time t is compared with a limit value $m_{K,max1}$, so that if the value $m_{K,max1}$ is exceeded, it is possible to intervene in the control of the screw compressor. In concrete terms, for example, a higher partial flow can be guided past the oil cooler in the oil circuit, so that the oil heats up overall. Also, the additional cooling power generated by a fan could be turned off or limited by turning off or shutting down the fan. In such a case, the target default value for the compression discharge temperature can be increased in a very concrete embodiment or an extension of the load running interval of the screw compressor can be provided, if this is technically possible. With regard to a target temperature of the compression discharge temperature (VET), an increase by a predetermined amount can also be provided, for example by a predetermined temperature value, in particular by 5K, so that $VET_{Soll,neu}=VET_{Soll,alt}+5K$ then applies.

In another preferred embodiment, the total condensate mass $m_K(t)$ generated at a point in time t is compared with a limit value $m_{K,max2}$ and a warning or error message is issued if the value $m_{K,max2}$ is exceeded.

In a concrete preferred embodiment, the water inlet mass flow $\dot{m}_{ein}(t)$ is calculated from the inlet air mass flow $\dot{m}_{Luft}(t)$ with the assumption of a relative humidity of 100%. This assumption makes the method according to the invention particularly easy to carry out and the virtual sensor defined in this way is comparatively simply designed.

However, it is also possible to calculate the water inlet mass flow $\dot{m}_{ein}(t)$ from the inlet air mass flow $\dot{m}_{Luft}(t)$ with the assumption of a relative humidity with a fixed value F, with 70%≤F<100%, i.e. a fixed value for example of 90%, 80% or 70%, or to calculate a relative humidity dependent on the intake temperature $T_{Ans}$.

Finally, it would also be possible to determine the water inlet mass flow $\dot{m}_{ein}(t)$ from the inlet air mass flow on the basis of a certain value of a relative humidity <100%, wherein the value of the relative humidity could, for example, be recorded via a hardware sensor, estimated or otherwise used as a basis for determining the water inlet mass flow. For example, data from an external weather station can also be taken into account.

In a particularly preferred embodiment, at least the following parameters are used to determine the inlet air mass flow:
- a system-specific delivery characteristic, which depends in particular on the current speed n for screw compressors regulated by frequency converters, and preferably further also
- the pressure $p_{akt}$ in the oil separator tank (11),
- the ambient pressure $p_{amb}$, and
- intake temperature $T_{Ans}$.

In a particularly preferred embodiment, at least the following parameters are used to determine the water inlet mass flow $\dot{m}_{ein}(t)$:
- the inlet air mass flow $\dot{m}_{Luft}(t)$,
- the intake temperature $T_{Ans}$, and preferably also
- the ambient pressure $p_{amb}$, and
- a value for relative humidity, in particular a relative humidity value of 100%.

In a particularly preferred embodiment, at least the following parameters are used to determine the water outlet mass flow $\dot{m}_{aus}(t)$:
- the inlet air mass flow $\dot{m}_{Luft}(t)$,
- the pressure $p_{akt}$ in the oil separator tank (11),
- the temperature $T_2$ after the oil separator tank (11), and preferably also
- a value for relative humidity, e.g. a value of 100%.

In general, a water vapor mass flow $\dot{m}_w$ can be calculated as a function of temperature T, pressure p, inlet air mass flow $\dot{m}_{Luft}$ and relative humidity of air φ as follows:

$$\dot{m}_w(T, p, \dot{m}_{Luft}, \varphi) = \dot{m}_{Luft} \frac{\varphi p_{satw}(T)}{p} \frac{R_a}{R_w}$$

$R_a$ is the gas constant of air, $R_W$ is the gas constant of water vapor and $P_{sat,W}(T)$ is the vapor pressure of water at temperature T. The vapor pressure can be taken from water vapor tables or calculated using an approximation function, e.g. the Antoine equation:

$$p_{sat,w}(T) = \exp\left(A - \frac{B}{T+C}\right), \text{ with constants } A, B, C$$

The above-mentioned object is also solved in particular by an oil-injected screw compressor comprising a control unit, in particular a central one, which is adapted to carry out the method according to the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 3:
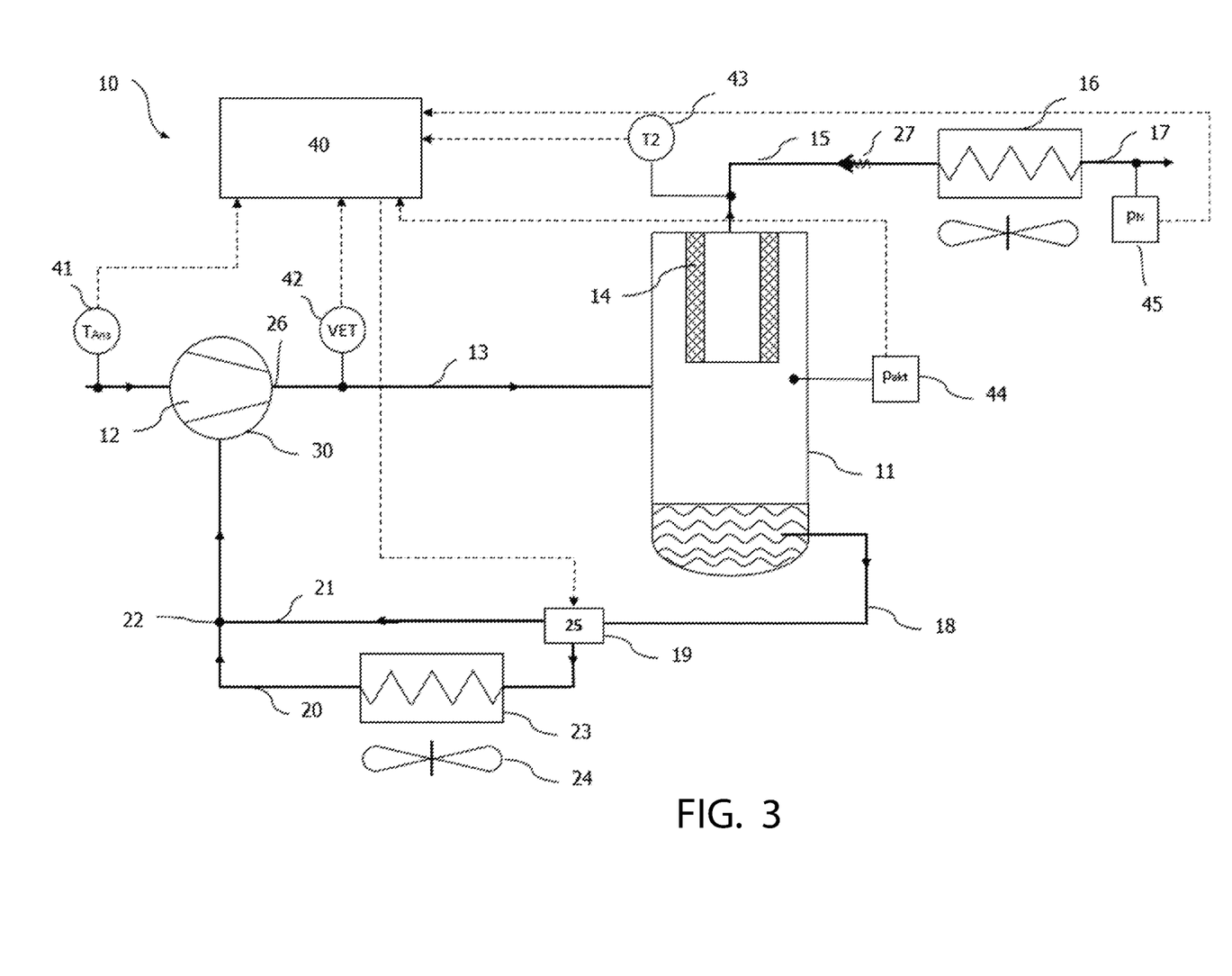
FIG. 3 shows a block diagram of an oil-injected screw compressor according to the invention with oil separator tank.

FIG. 3 shows a block diagram of a screw compressor 10 comprising a compressor block 30 and an oil separator 11. The screw compressor 10 also has a compression chamber 12 in the compressor block 30. Compressed air reaches the oil separator 11 via a first compressed-air line 13. An oil filter 14 is provided in the oil separator tank 11. The compressed air, which is fed via the first compressed-air line 13 into the oil separator tank 11, passes through the oil filter 14 and is fed via a second compressed-air line 15 to an aftercooler 16 and from there via a third compressed-air line 17 to a useful application, e.g. a line network buffered via a compressed-air tank in an industrial plant.

The oil separated in the oil separator tank 11 is returned via a return line 18 to the screw compressor 10 where it is injected into the compression chamber 12 for cooling, sealing and lubrication. The return line is divided into a first partial line 20 and a second partial line 21 at a branching point 19. The first partial line 20 and the second partial line 21 will be reunited in a unification point 22.

An oil cooler 23 is provided in the first partial line 20, which cooler extracts heat from the recirculated oil and for this purpose is cooled with an air stream generated by a fan 24 for better heat dissipation. The second partial line 21 forms a bypass through which oil can be guided past the oil cooler 23. With an electrically controllable, infinitely adjustable regulating valve 25, the ratio between the oil guided through the oil cooler 23 and the oil guided past the oil cooler 23 can be infinitely adjusted. This allows the temperature of the oil injected into compression chamber 12 to be set to a desired value.

During normal operation, the oil temperature of the oil injected back into compression chamber 12 is set to such a temperature value that the compression discharge temperature (VET) at an outlet 26 of the screw compressor 10 is at such a temperature level that condensate accumulation in the oil separator tank 11 is avoided. At the same time, a minimum compression discharge temperature of e.g. 60° C.

is targeted. Also, a maximum compression discharge temperature must not be exceeded, let alone due to legal requirements. In this respect, a compression discharge temperature of no higher than 95° C. is the target for most screw compressors.

During normal operation, the compression discharge temperature should be set as low as possible in the aforementioned areas in order to avoid unnecessary stress of the oil; on the other hand, as already mentioned, condensate formation should be prevented with certainty.

The screw compressor 10 further has a central control unit 40 or interacts with such a central control unit 40. The central control unit 40 can receive data from various sensors in a preferred embodiment, namely from a first temperature sensor which is designed and arranged to detect the intake temperature $T_{Ans}$, a second temperature sensor 42 which is arranged to detect the compression discharge temperature at an outlet of the compressor block 30 and a third temperature sensor 43 which is designed and arranged to detect the temperature $T_2$ after the oil separator 11. The central control unit 40 also receives data from two pressure sensors, namely a first pressure sensor 44 which is arranged and provided for the detection of a pressure $P_{akt}$ in the oil separator tank 11 and a second pressure sensor 45 which is intended for the detection of a network pressure $P_N$ after the aftercooler. A further third pressure sensor (not shown) may be located on the central control unit to detect and transmit an ambient pressure $P_{amb}$. However, the ambient pressure can also be taken into account as an assumed value or received externally, for example via a data network, for example from a weather station. In addition, a fixed assumed temperature value can be used instead of the temperature $T_{Ans}$, which is recorded by the temperature sensor 42, for example. A fixed temperature value of 25° C. or 30° C. may optionally also be used, for example, depending on the installation location. Instead of a pressure $P_{Akt}$ in the oil separator tank 11, it is also possible to recalculate the pressure in the oil separator tank $P_{Akt}$ from the data supplied by the pressure sensor 45, i.e. from the network pressure $P_N$, or the pressure in the oil separator tank $P_{Akt}$ can be estimated from the network pressure $P_N$. Furthermore, a fixed value for the pressure in the oil separator tank $P_{Akt}$ can also be assumed, for example the maximum value which is preset on the operating side for the screw compressor or a maximum value which is preset by an operator at the control unit of the screw compressor.

According to the present invention, a method or a virtual sensor is proposed to monitor or determine the correct functioning of the above-mentioned regulation if condensate accumulation appears to be inadvertently possible. For this purpose, water mass flows are compared with each other at respectively predetermined sampling times and a currently generated condensate flow is determined from this. From an addition of the value of the currently generated condensate flow, which can assume different signs, and the condensate mass already present from previous calculations, a currently existing condensate mass is calculated.

Since a worst-case scenario can be assumed when determining the water inlet mass flow, for example that the ambient air has a 100% relative humidity, certain values, such as condensate flow or condensate mass, are always to be understood as "currently possible generated condensate flow or currently possible condensate mass", i.e. also as a worst-case scenario. With the water outlet mass flow, on the other hand, it is assumed that there is 100% saturation anyway if condensate is to be discharged, so that here the maximum possible water outlet mass flow should at least approximately coincide with the actually discharged water outlet mass flow.

Figure 2:
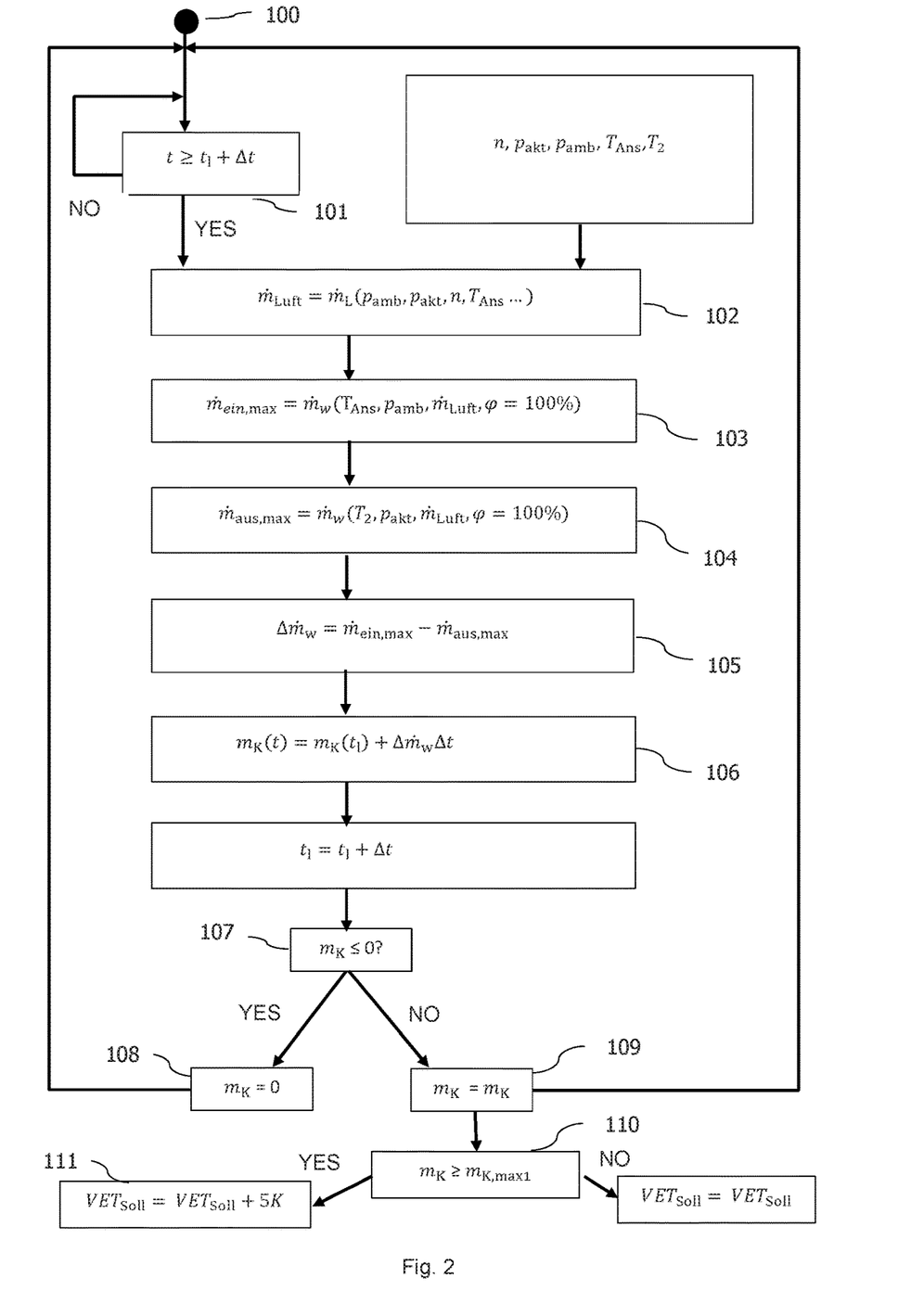
FIG. 2 shows a flowchart depicting a preferred embodiment of the present invention.

On the basis of the flowchart according to FIG. 2, the preferred embodiment of the method according to the invention is again explained in detail below. In step 100 the method is started and in step 101 it is checked whether the screw compressor is running under load and one second has already passed. If the result of this test is negative, this test step must be repeated. If the result is positive, a possible air mass flow or inlet air mass flow is calculated in a step 102 as follows:

$$\dot{m}_{Luft}(t)=\dot{m}_L(p_{amb}, p_{akt}, n, T_{Ans} \dots) \quad (1)$$

The calculation of the possible air mass flow includes a system-specific delivery characteristic, which depends on the current speed n for screw compressors regulated by frequency converters, the pressure $p_{akt}$ in the oil separator tank 11, the ambient pressure $p_{amb}$, and the intake temperature $T_{Ans}$ after the oil separator tank 11.

In a step 103, a water inlet mass flow is calculated from the possible air mass flow according to the following formula (2):

$$\dot{m}_{ein}(t)=\dot{m}_w(T_{Ans}, p_{amb}, \dot{m}_{Luft}, \varphi=100\%) \quad (2)$$

This calculation or determination is based on a worst case scenario, i.e. it is assumed that the aspirated ambient air has a relative humidity of 100%.

In a step 104, the current water outlet mass flow is calculated with the following formula (3)

$$\dot{m}_{aus}(t)=\dot{m}_w(T_2, p_{akt}, \dot{m}_{Luft}, \varphi=100\%) \quad (3)$$

in which the temperature $T_2$ after the oil separator tank 11, the pressure in the oil separator tank $p_{akt}$, the inlet air mass flow $\dot{m}_{Luft}$ and a relative humidity of 100% are included in this calculation. It should be clear to the person skilled in the art that steps 103 and 104 can also take place in reverse order or at the same time.

From the water inlet mass flow determined in step 103 and the water outlet mass flow determined in step 104, a current water mass change rate, i.e. a currently generated condensate mass, is calculated in step 105 according to equation (4) as follows:

$$\Delta\dot{m}_w(t)=\dot{m}_{ein}(t)-m_{aus}(t) \quad (4).$$

If the currently generated water mass change rate or the currently generated condensate mass is positive, condensate is actually produced and an existing condensate mass is increased. If, on the other hand, the value of the currently generated water mass change rate or the currently generated condensate mass is negative, condensate is discharged, i.e. a current condensate mass is reduced.

The currently present condensate mass $m_K$ is calculated according to equation (5) in step 106, so that the currently given condensate mass is updated taking into account the current water mass change rate calculated in step 105.

The method could theoretically start again from scratch at this point if the determination of the currently given condensate mass $m_K$ is only to take place in the sense of a virtual sensor.

However, other measures may also be considered. For this purpose, step 107 checks whether the currently given condensate mass $m_K \leq 0$. In this case, the currently given condensate mass is set to zero in one step 108 and the process is started from the beginning. If the currently given condensate mass $m_K$ is positive, on the other hand, the process is restarted in a step 109 with the currently given condensate mass $m_K$, and on the other hand in a step 110 it is checked whether the currently given condensate mass $m_K$ is above a limit value $m_{K,max1}$, i.e. above a certain amount of condensate. If this is the case, in a further step 111 the target value of the compression discharge temperature is increased by 5K until the currently given condensate mass has reached the value 0 again. However, it is also taken into account that the compression discharge temperature does not exceed a maximum value of 95° C. However, if it is determined in step 110 that the currently present condensate mass has not exceeded the specified limit value of $m_{K,max1}$, the target value of the compression discharge temperature is not affected.

Although above a mass flow or a mass change rate was represented as a quantity characterizing the water flow or the condensate accumulation, a volume flow at a suitable reference condition or also a mass flow can be used instead. Alternatively, it would also be possible to calculate a quantity characterizing the condensate mass change approximately by the product of a quantity characterizing the air mass flow (e.g. mass, volume, quantity) and the difference of the water vapor pressures of inlet and outlet each converted to a common reference pressure.

Although only a few embodiments of the present invention have been shown and described, it is to be understood that many changes and modifications may be made thereunto without departing from the spirit and scope of the invention.

LIST OF REFERENCE SIGNS

VET Compression discharge temperature
$\dot{m}_{Luft}$ Inlet air mass flow
$\dot{m}_{ein,max}$ Maximum possible water inlet mass flow
$\dot{m}_{aus,max}$ Maximum possible water outlet mass flow
$\Delta\dot{m}_w$ Currently generated condensate flow
$m_K(t)$ Condensate mass
1' Suction point
10 Screw compressor
11, 11' Oil separator tank
12 Compression chamber
13 First compressed-air line
14, 14' Oil filter
15 Second compressed-air line
16, 16' Aftercooler
17 Third compressed-air line
18 Return line
19 Branching point
20 First partial line
21 Second partial line
22 Unification point
23, 23' Oil cooler
24 Fan
25, 25' Regulating valve
Outlet (screw compressor)
27, 27' Non-return valve
30, 30' Compressor block
40, 40' Central control unit
41, 41' First temperature sensor ($T_{Ans}$)
42, 42' Second temperature sensor (VET)
43, 43' Third temperature sensor ($T_2$)
44, 44' First pressure sensor ($P_{akt}$)
45, 45' Second pressure sensor ($P_N$)

What is claimed is:

1. A method for monitoring an oil-injected screw compressor, the method comprising:
   determining at points in time over a specified time interval condensate mass flows in an oil circuit of the oil-injected screw compressor that is configured to compress aspirated air, each condensate mass flow determined at a given point in time, t, by:
   determining a water inlet mass flow $\dot{m}_{ein}(t)$ at the given point in time;
   determining a water outlet mass flow $\dot{m}_{aus}(t)$ at the given point in time, t; and
   calculating the condensate mass flow, $\Delta\dot{m}_w(t)$, at the given point in time as a difference between the water inlet mass flow and the water outlet mass flow, $\Delta\dot{m}_w(t)=\dot{m}_{ein}(t)-\dot{m}_{aus}(t)$;
   using all the condensate mass flows over the specified time interval to determine a total condensate mass, $m_K$, in the oil circuit;
   comparing the total condensate mass, $m_K$, to a limit value $m_{K,max1}$; and
   intervening in a control unit of the screw compressor when the total condensate mass exceeds the limit value, $$m_K > m_{K,max1}.$$

2. The method according to claim 1, wherein using all the condensate mass flows over the specified time interval to determine the total condensate mass, $m_K$, comprises calculating a summation of the total condensate masses at each point in time over the specified time interval, by calculating for a regular time interval, dt, the condensate mass at a previous point in time, $m_K(t-dt)$, and a condensate mass flow, $\Delta\dot{m}_w$, over the regular time interval, dt, $m_K(t)=m_K(t-dt)+\Delta\dot{m}_w \cdot dt$.

3. The method according to claim 1, wherein using all the condensate mass flows over the specified time interval to determine the total condensate mass $m_K$, comprises calculating the condensate mass as a sum of a known initial value at an initial time, $t_0$, of the condensate mass $m_K(t_0)$ and a numerical integration of the condensate flow $\Delta\dot{m}_w$ over the specified time interval, $m_K = m_K(t_0) + \int_{di\ 0}^{t} \Delta\dot{m}_w(\tau) d\tau$.

4. The method according to claim 1, wherein intervening in a control unit of the screw compressor comprises increasing a target value for the compression discharge temperature (VET) is increased by a predetermined temperature value.

5. The method according to claim 1, wherein the method further comprises:
   comparing the total condensate mass $m_K$ to a limit value $m_{K,max2}$; and
   issuing an error message when the total condensate mass exceeds the limit value $$m_K > m_{K,max2}.$$

6. The method according to claim 1, wherein determining the water inlet mass flow, $\dot{m}_{ein}(t)$, comprises calculating the water inlet mass flow from an inlet air mass flow $\dot{m}_{Luft}(t)$ and an assumed relative humidity of 100%.

7. The method according to claim 1, wherein determining the water inlet mass flow, $\dot{m}_{ein}(t)$, comprises calculating the water inlet mass flow using an inlet air mass flow $\dot{m}_{Luft}(t)$ and a relative humidity with a fixed value, F, of between 70% and 100%, 70%≤F<100%, or a relative humidity dependent on an intake temperature, $T_{Ans}$, of the screw compressor.

8. The method according to claim 6, wherein the method further comprises determining the inlet air mass flow $\dot{m}_{Luft}(t)$ using a system-specific delivery characteristic, which depends on a current speed, n, of the screw compressors, pressure $p_{akt}$, in an oil separator tank fed by the screw compressor, ambient pressure $p_{amb}$, and intake temperature $T_{Ans}$.

9. The method according to claim 8, wherein determining the water inlet mass flow, $\dot{m}_{ein}(t)$, further comprises using the inlet air mass flow $\dot{m}_{Luft}(t)$, the intake temperature $T_{Ans}$, the ambient pressure $p_{amb}$, and the relative humidity of 100%, to determine the water inlet mass flow.

10. The method according to claim 8, wherein determining the water outlet mass flow, $\dot{m}_{aus}(t)$, further comprises using the inlet air mass flow, $\dot{m}_{Luft}(t)$, the pressure, $p_{akt}$, in the oil separator tank a temperature after the oil separator tank $T_2$, and the relative humidity, of 100% are included to determine the water outlet mass flow.

11. An oil-injected screw compressor comprising a control unit adapted to perform the method according to claim 1.

12. The method according to claim 7, wherein the method further comprises determining the inlet air mass flow $\dot{m}_{Luft}(t)$ using a system-specific delivery characteristic, which depends on a current speed, n, of the screw compressor, pressure, $p_{akt}$, in an oil separator tank (11) fed by the screw compressor, ambient pressure, $p_{amb}$, and intake temperature, $T_{Ans}$.

13. A method for monitoring an oil-injected screw compressor, the method comprising:
   determining at points in time over a specified time interval condensate mass flows in an oil circuit of the oil-injected screw compressor that is configured to compress aspirated air, each condensate mass flow determined at a given point in time, t, by:
      determining a water inlet mass flow $\dot{m}_{ein}(t)$ at the given point in time;
      determining a water outlet mass flow $\dot{m}_{aus}(t)$ at the given point in time, t; and
      calculating the condensate mass flow, $\Delta\dot{m}_w(t)$, at the given point in time as a difference between the water inlet mass flow and the water outlet mass flow, $\Delta\dot{m}_w(t) = \dot{m}_{ein}(t) - \dot{m}_{aus}(t)$;
   using all the condensate mass flows over the specified time interval to determine a total condensate mass, $m_K$, in the oil circuit by calculating the condensate mass as a sum of a known initial value at an initial time, $t_0$, of the condensate mass, $m_K(t_0)$, and a numerical integration of the condensate flow $\Delta\dot{m}_w$ over the specified time interval, $m_K = m_K(t_0) + \int_{t_0}^{t} \Delta\dot{m}_w(\tau) d\tau$;
   comparing the total condensate mass, $m_K$, to a limit value $m_{K,max1}$; and
   intervening in a control unit of the screw compressor when the total condensate mass exceeds the limit value, $m_K > m_{K,max1}$.

14. A method for monitoring an oil-injected screw compressor, the method comprising:
   determining at points in time over a specified time interval condensate mass flows in an oil circuit of the oil-injected screw compressor that is configured to compress aspirated air, each condensate mass flow determined at a given point in time, t, by:
      determining a water inlet mass flow $\dot{m}_{ein}(t)$ at the given point in time by
         calculating the water inlet mass flow using an inlet air mass flow $\dot{m}_{Luft}(t)$
         and a relative humidity with a fixed value, F, of between 70% and 100%, 70% < F < 100%, or a relative humidity dependent on an intake temperature, $T_{Ans}$, of the screw compressor;
      determining a water outlet mass flow $\dot{m}_{aus}(t)$ at the given point in time, t; and
      calculating the condensate mass flow, $\Delta\dot{m}_w(t)$ at the given point in time as a difference between the water inlet mass flow and the water outlet mass flow, $\Delta\dot{m}_w(t) = \dot{m}_{ein}(t) - \dot{m}_{aus}(t)$; and
   using all the condensate mass flows over the specified time interval to determine a total condensate mass, $m_K$, in the oil circuit by calculating the condensate mass as a sum of a known initial value at an initial time, $t_0$, of the condensate mass, $m_K(t_0)$, and a numerical integration of the condensate flow $\Delta\dot{m}_w$ over the specified time interval, $m_K = m_K(t_0) + \int_{t_0}^{t} \Delta\dot{m}_w(\tau) d\tau$;
   comparing the total condensate mass, $m_K$, to a limit value $m_{K,max1}$; and
   intervening in a control unit of the screw compressor when the total condensate mass exceeds the limit value, $m_K > m_{K,max1}$.

\* \* \* \* \*

UNITED STATES PATENT AND TRADEMARK OFFICE
CERTIFICATE OF CORRECTION

PATENT NO. : 11,519,411 B2
APPLICATION NO. : 16/686476
DATED : December 6, 2022
INVENTOR(S) : Wolfgang Feiler

Page 1 of 1

It is certified that error appears in the above-identified patent and that said Letters Patent is hereby corrected as shown below:

In the Claims

In Column 10, Line 39 (Line 4 of Claim 4): delete "is increased"
In Column 11, Line 9 (Line 4 of Claim 10): change "tank" to --tank,--
In Column 11, Line 10 (Line 5 of Claim 10): after "humidity" delete ","
In Column 11, Line 10 (Line 5 of Claim 10): after "100%" delete "are included"
In Column 11, Line 19 (Line 5 of Claim 12): delete "(11)"

Signed and Sealed this
Eighteenth Day of July, 2023

Katherine Kelly Vidal
*Director of the United States Patent and Trademark Office*